United States Patent Office 2,855,400
Patented Oct. 7, 1958

2,855,400

2-METHYL-PYRIDINE-4-CARBOXYLIC ACID DERIVATIVES

Hugo Gutmann, Birsfelden, Otto Isler, Basel, and Otto Straub, Bottmingen, Switzerland, assignors to Hoffmann-La Roche Inc., Nutley, N. J., a corporation of New Jersey No Drawing. Application June 25, 1953
Serial No. 364,204

Claims priority, application Switzerland June 27, 1952

6 Claims. (Cl. 260—295)

The present invention concerns novel 2-methyl-pyridine-4-carboxylic acid derivatives and a process for the manufacture thereof.

The process provided by the invention comprises reacting a compound of the general formula

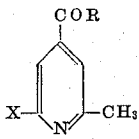

or a hydrohalide thereof, wherein R represents halogen or alkoxy and X represents hydrogen or halogen, with a hydrazine of the general formula

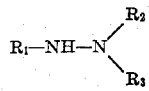

or a salt thereof wherein $R_1$, $R_2$ and $R_3$ represent hydrogen, alkyl, aralkyl or alkenyl, and, if X is halogen, replacing the halogen in position 6 by hydrogen according to methods known per se.

When using as starting compound an unsubstituted hydrazine or the hydrate or a salt thereof, the condensation should preferably be performed with a 2-methyl-pyridine-4-carboxylic acid ester. The condensation with hydrazine hydrate is preferably carried out by reacting the two components in a solvent, for example in an alcohol, suitably at slightly elevated temperature.

If a substituted hydrazine or a salt thereof is used as starting material, then the same is reacted with a 2-methyl-pyridine-4-carboxylic acid halide or with a hydrohalide of the latter. The reaction is carried out with preference in the presence of a hydrogen halide binding agent, such as pyridine.

The following hydrazines may be used as starting material: hydrazine, $N^1$-methylhydrazine, $N^1$-ethylhydrazine, $N^1$-propylhydrazine, $N^1$-isopropylhydrazine, $N^1$-allylhydrazine, $N^1$-benzylhydrazine, $N^1,N^1$-dimethylhydrazine, $N^1,N^1$-diethylhydrazine, $N^1,N^1$-diallylhydrazine, $N^1,N^2$-dimethylhydrazine, $N^1,N^2$-diethylhydrazine, $N^1,N^2$-diisopropylhydrazine, $N^1,N^2$-dibenzylhydrazine, $N^1,N^2,N^2$-trimethylhydrazine. Instead of the free bases, the salts thereof, e. g. the hydrochlorides, may be used.

When a monosubstituted hydrazine is reacted with the 2-methylpyridine-4-carboxylic acid halide, the product obtained is a $N^1$-(2-methyl-pyridyl-(4)-carbonyl)-$N^1$- or $N^2$-substituted hydrazine, when using a $N^1,N^1$-disubstituted hydrazine, the product obtained is a $N^1$-(2-methyl-pyridyl-(4)-carbonyl)-$N^2,N^2$-disubstituted hydrazine, when using a $N^1,N^2$-disubstituted hydrazine the final product is a $N^1$-(2-methyl-pyridyl-(4)-carbonyl)-$N^1,N^2$-disubstituted hydrazine and when using a $N^1,N^2,N^2$-trisubstituted hydrazine the product obtained is a $N^1$-(2 - methyl-pyridyl - (4) - carbonyl) - $N^1,N^2,N^2$ - trisubstituted hydrazine. If the substituted $N^1$-(2-methylpyridyl-(4)-carbonyl)-hydrazines obtained still carry at least one hydrogen atom attached to a nitrogen atom of the hydrazine moiety, they may be further substituted by subsequently treating the same with an alkali metal, such as sodium or potassium, dissolved in a lower alkanol, such as for example methanol or ethanol, and by reacting the reaction mixture formed with an alkyl, aralkyl or alkenyl halide. Examples of alkyl, aralkyl or alkenyl halides which may be employed accordingly, are methyl iodide, ethyl bromide, propyl bromide, isopropyl bromide, butyl chloride, benzyl chloride, allyl bromide. The additional substitution of the $N^1$- or $N^2$-substituted $N^1$-(2-methyl-pyridyl-(4)-carbonyl)-hydrazines formed by the reaction of a 2-methyl-pyridine-4-carboxylic acid halide with the above referred mono- and disubstituted hydrazines may also be achieved according to other known methods, for example by means of alkyl sulfates.

If a compound with a halogen atom in 6-position is used as starting material (X=halogen in the first formula in column 1), then the substitution of hydrogen for the halogen atom is preferably performed by catalytic hydrogenolysis in the presence of a hydrogenation catalyst, such as palladium charcoal, and of a halogen halide binding agent, such as alkali acetate or ammonia. The hydrogenation medium is preferably an aliphatic alcohol, for example methanol. A particularly suitable mode of procedure comprises reacting a 2-methyl-6-chloro-pyridine-4-carboxylic acid lower alkylester with hydrogen in the presence of a palladium charcoal catalyst and of a hydrogen chloride binding agent, which has no hydrolizing action on the ester, and treating the 2-methyl-pyridine-4-carboxylic acid lower alkylester formed with hydrazine hydrate.

The 2-methyl-6-halogeno-pyridine-4-carboxylic acid lower alkylesters or halides used as starting material may be prepared by condensing cyanoacetic amide with an acetyl-pyruvic acid ester (Chemische Berichte 82 [1949], page 36) and converting the 2-methyl-5-cyano-6-hydroxy-pyridine-4-carboxylic acid ester so formed, according to the Journal of the Chemical Society 1929, page 2223, by treating the same with concentrated hydrochloric acid into 2 - methyl - 6 - hydroxy-pyridine - 4 - carboxylic acid. Upon treatment with a phosphorous halide, this acid yields the corresponding 2-methyl-6-halogeno-pyridine-4-carboxylic acid halide. The latter may be transformed without any further purification by treatment with a lower alkanol into the corresponding esters. The halogen free 2-methyl-pyridine-4-carboxylic acid alkylesters may be prepared by esterification of the known 2-methyl-pyridine-4-carboxylic acid.

The 2-methyl-pyridine-4-carboxylic acid derivatives and the salts of the latter obtained according to the invention possess remarkable chemotherapeutic properties and may be used therapeutically, more particularly in combating tuberculosis. Some of them are suitable intermediates for the preparation of such chemotherapeutically active compounds. The said compounds easily form addition salts with acids, for example with hydrochloric acid, hydrobromic acid, nitric acid, sulfuric acid, phosphoric acid, tartaric acid, oxalic acid.

Examples of products which may be prepared in accordance with the process of the present invention are:

2-methyl-pyridine-4-carboxylic acid hydrazide, $N^1$ - (2 - methyl-pyridyl - (4) - carbonyl) - $N^1$-methylhydrazine, $N^1$ - (2 - methyl-pyridyl - (4) - carbonyl) - $N^1$ - isopropylhydrazine, $N^1$ - (2 - methyl-pyridyl - (4) - carbonyl) - $N^1$ - allylhydrazine, $N^1$ - (2 - methyl-pyridyl - (4) - carbonyl) - $N^2$ - methyl-hydrazine,
$N^1$ - (2 - methyl-pyridyl - (4) - carbonyl) - $N^2$ - isopropyl-hydrazine,
$N^1$ - (2 - methyl-pyridyl - (4) - carbonyl) - $N^2$ - allyl-hydrazine,
$N^1$ - (2 - methyl-pyridyl - (4) - carbonyl) - $N^1,N^2$ - dimethyl-hydrazine,
$N^1$ - (2 - methyl-pyridyl - (4) - carbonyl) - $N^1,N^2$ - diethyl-hydrazine,
$N^1$ - (2 - methyl-pyridyl - (4) - carbonyl) - $N^1,N^2$ - diisopropyl-hydrazine,
$N^1$ - (2 - methyl-pyridyl - (4) - carbonyl) - $N^1,N^2$ - dibenzyl-hydrazine,
$N^1$ - (2 - methyl-pyridyl - (4) - carbonyl) - $N^1,N^2$ - diallyl-hydrazine,
$N^1$ - (2 - methyl-pyridyl - (4) - carbonyl) - $N^2,N^2$ - dimethyl-hydrazine,
$N^1$ - (2 - methyl-pyridyl - (4) - carbonyl) - $N^2,N^2$ - diethyl-hydrazine,
$N^1$ - (2 - methyl-pyridyl - (4) - carbonyl) - $N^2,N^2$ - diisopropyl-hydrazine,
$N^1$ - (2 - methyl-pyridyl - (4) - carbonyl) - $N^2,N^2$ - dibenzyl-hydrazine,
$N^1$ - (2 - methyl - pyridyl-(4)-carbonyl)-$N^2,N^2$-diallyl-hydrazine,
$N^1$ - (2-methyl-pyridyl-(4)-carbonyl)-$N^1,N^2,N^2$-trimethyl-hydrazine,
$N^1$ - (2 - methyl - pyridyl-(4)-carbonyl)-$N^1,N^2,N^2$-triallyl-hydrazine,
$N^1$ - (2 - methyl - pyridyl-(4)-carbonyl)-$N^1$-benzyl-$N^2,N^2$-dimethyl-hydrazine,
$N^1$ - (2 - methyl-pyridyl-(4)-carbonyl)-$N^1$-allyl-$N^2,N^2$-dimethyl-hydrazine,
$N^1$ - (2 - methyl-pyridyl-(4)-carbonyl)-$N^1$-methyl-$N^2,N^2$-diethyl-hydrazine,
$N^1$ - (2 - methyl-pyridyl-(4)-carbonyl)-$N^1$-methyl-$N^2,N^2$-dibenzyl-hydrazine,
$N^1$ - (2 - methyl-pyridyl-(4)-carbonyl)-$N^1$-ethyl-$N^2,N^2$-diallyl-hydrazine,
$N^1$ - (2 - methyl-pyridyl-(4)-carbonyl)-$N^1$-isopropyl-$N^2,N^2$-diethyl-hydrazine,
$N^1$ - (2-methyl-pyridyl-(4)-carbonyl)-$N^1$-allyl-$N^2,N^2$-diethyl-hydrazine,

*Example 1*

200 parts by weight of 2-methyl-6-chloro-pyridine-4-carboxylic acid methylester of melting point 60° C. are dissolved in 1000 parts by volume of methanol; 116 parts by weight of water free potassium acetate and 20 parts by weight of a palladium charcoal catalyst are added. The mixture is shaken with hydrogen at atmospheric pressure. After 1 mol hydrogen has been absorbed, the hydrogenation is interrupted and the mixture is filtered with suction. The filtrate is concentrated, the residue is taken up in methylene chloride, the solution obtained is washed first with sodium bicarbonate solution and with water until its reaction is neutral. The methylene chloride is distilled off and the residue is fractioned in vacuo to yield 122 parts by weight of a distillate of boiling point 105–110° C./17 mm., corresponding to a 75% yield of 2-methyl-pyridine-4-carboxylic acid methylester.

The product purified by distillation is dissolved in 80 parts by volume of methanol, 60 parts by weight of 85% hydrazine hydrate are added and the mixture is heated up to 50° C. for 2 hours. The solvent is then distilled off in vacuo and the viscous residue, which upon cooling solidifies to a crystal mass, is recrystallized in ethanol. 104 parts by weight of 2-methyl-pyridine-4-carboxylic acid hydrazide of melting point 113–114° C., corresponding to a yield of 85%, are obtained.

*Example 2*

100 parts by weight of 2-methyl-6-chloro-pyridine-4-carboxylic acid methylester are dissolved by heating in 200 parts by volume of methanol. While stirring, 38 parts by weight of 85% hydrazine hydrate are added at 50° C. within 15 minutes. The mixture is stirred at the same temperature for one additional hour, cooled down while stirring to −10° C., whereupon the 2-methyl-6-chloro-pyridine-4-carboxylic acid hydrazide crystallizes out. The crystals are sucked off, washed with 120 parts by volume of methanol precooled to −10° C. and dried. The product may be purified by recrystallization in water or ethanol and its melting point is then 147–148° C.

100 parts by weight of the pure product obtained are dissolved in a mixture of 21.6 parts by weight of sodium hydroxide and 400 parts by volume of water, 20 parts by weight of palladium charcoal catalyst are added, and the mixture is shaken at atmospheric pressure with hydrogen until hydrogen in the proportion of 1 mol for each mol of the 2-methyl-6-chloro-pyridine-4-carboxylic acid hydrazide has been taken up. The catalyst is separated off, the solution is concentrated in vacuo and the last traces of water are eliminated from the residue by azeotropic distillation with absolute alcohol. The residue is now extracted with boiling absolute alcohol and the extract is freed from sodium chloride by suction. The filtrate is concentrated to a volume of 150 parts and 1200 parts by volume of hot benzene are added with stirring. The solution is again concentrated to a volume of 1000 parts and cooled down to 5° C., whereupon 65 parts by weight of 2-methyl-pyridine-4-carboxylic acid hydrazide of melting point 113–114° C. crystallize out; yield 80%.

*Example 3*

27.4 parts by weight of 2-methyl-pyridine-4-carboxylic acid are refluxed for 2 hours with 100 parts by volume of thionyl chloride and the excess thionyl chloride is then eliminated by distillation under reduced pressure. The residue consisting of 2-methyl-pyridine-4-carboxylic acid chloride hydrochloride is suspended is 200 parts by volume of dry pyridine and 19.2 parts by weight of $N^1,N^1$-dimethylhydrazine hydrochloride are added. The mixture is then heated for one hour on the steam bath, concentrated to dryness under reduced pressure and the residue is taken up in chloroform. The chloroformic solution is shaken with saturated potassium carbonate solution, dried over sodium sulfate and concentrated in vacuo, whereupon the oily residue is repeatedly recrystallized in benzene with the addition of charcoal. The $N^1$ - (2 - methyl - pyridyl-(4)-carbonyl)-$N^2,N^2$-dimethyl-hydrazine obtained melts at 118–122° C.

*Example 4*

54.8 parts by weight of 2-methyl-pyridine-4-carboxylic acid are refluxed for 2 hours with 200 parts by volume of thionyl chloride and the excess thionyl chloride is then eliminated by distillation under reduced pressure. The residue consisting of 2-methyl-pyridine-4-carboxylic acid chloride hydrochloride is suspended in 400 parts by volume of dry pyridine and 50 parts by weight of $N^1,N^1$-diethyl-hydrazine-hydrochloride are added. The mixture is heated for 1 hour on the steam bath, concentrated to dryness under reduced pressure, the residue is taken up in chloroform, the chloroform solution is shaken with saturated potassium carbonate solution, dried over sodium sulfate and concentrated to dryness, the residue is taken up in benzene and a small amount of ethanol, the solution is repeatedly shaken with charcoal, the filtrate is concentrated to dryness and the residue is crystallized in a benzene petroleum ether mixture. The $N^1$-(2-methyl-pyridyl-(4)-carbonyl)-$N^2,N^2$-diethyl-hydrazine thus obtained melts at 92–95° C.

*Example 5*

53 parts by weight of 2-methyl-pyridine-4-carboxylic acid are converted with 200 parts by volume of thionyl chloride, as indicated in Example 2, into the acid chloride hydrochloride and the latter is reacted with 43.6 parts by weight of $N^1,N^1$-diallyl-hydrazine in 400 parts by volume of dry pyridine. The residue obtained after having concentrated to dryness is taken up in chloroform, the chloroform solution is shaken with saturated potassium carbonate solution, dried and concentrated to dryness, the oily residue is repeatedly shaken in benzene with charcoal and, after having concentrated to dryness, repeatedly recrystallized in a benzene petroleum ether mixture. The $N^1$ - (2 - methyl - pyridyl-(4)-carbonyl)-$N^2,N^2$-diallyl-hydrazine thus obtained melts at 72–75° C.

We claim:

1. A compound having the formula

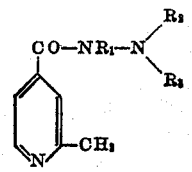

wherein $R_1$, $R_2$ and $R_3$ represent members of the group consisting of hydrogen, lower alkyl and lower alkenyl, $R_2$ and $R_3$ each representing the same substituent selected from the aforesaid group consisting of hydrogen, lower alkyl and lower alkenyl when $R_1$ represents hydrogen, and therapeutically acceptable acid addition salts of said compounds.

2. A compound having the formula

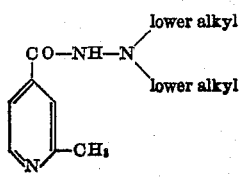

3. A compound having the formula

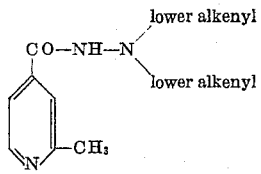

4. $N^1$ - [2 - methyl - pyridyl - (4) - carbonyl]-$N^2,N^2$-dimethyl hydrazine.

5. A therapeutically acceptable salt of 2-methyl-isonicotinic acid hydrazide.

6. The compound of the formula:

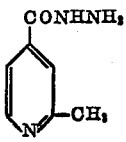

References Cited in the file of this patent

UNITED STATES PATENTS

| | | |
|---|---|---|
| 2,596,069 | Fox | May 6, 1952 |
| 2,666,053 | Fox | Jan. 12, 1954 |
| 2,685,585 | Fox | Aug. 3, 1954 |

OTHER REFERENCES

Meyer: Monatshefte fur Chemie, vol. 33, pages 400–402 (1912).

Graf: J. Prakt. Chemie, vol. 133, page 24 (1932).

Bernstein et al.: Am. Review of Tuberculosis, vol. 67, page 355 (March 1953).

Yale et al.: J. Am. Chem. Soc., vol. 75, page 1936 (1953). (Received October 29, 1952.)